US011700968B2

(12) United States Patent
Samartgis

(10) Patent No.: US 11,700,968 B2
(45) Date of Patent: Jul. 18, 2023

(54) INFUSER CONTAINER

(71) Applicant: The Decor Corporation Pty. Ltd., Dandenong South (AU)

(72) Inventor: Jim Samartgis, Bulleen (AU)

(73) Assignee: The Decor Corporation Pty. Ltd., Dandenong South (AU)

( * ) Notice: Subject to any disclaimer, the term of this patent is extended or adjusted under 35 U.S.C. 154(b) by 151 days.

(21) Appl. No.: 16/967,505

(22) PCT Filed: Feb. 5, 2019

(86) PCT No.: PCT/AU2019/050085
§ 371 (c)(1),
(2) Date: Aug. 5, 2020

(87) PCT Pub. No.: WO2019/153038
PCT Pub. Date: Aug. 15, 2019

(65) Prior Publication Data
US 2021/0212500 A1    Jul. 15, 2021

(30) Foreign Application Priority Data
Feb. 7, 2018 (AU) .................................. 2018900381

(51) Int. Cl.
*A47J 31/14* (2006.01)
*A47G 19/12* (2006.01)
(Continued)

(52) U.S. Cl.
CPC .............. *A47J 31/14* (2013.01); *A47G 19/12* (2013.01); *A47J 31/0626* (2013.01);
(Continued)

(58) Field of Classification Search
CPC ....... A47J 31/14; A47J 31/0626; A47G 19/12; A47G 19/16; A47G 2400/04;
(Continued)

(56) References Cited

U.S. PATENT DOCUMENTS

| | | | |
|---|---|---|---|
| 222,444 A * | 12/1879 | Berry | B67D 3/0009 |
| | | | 222/131 |
| 473,727 A * | 4/1892 | Chidley | A47J 31/02 |
| | | | 222/481 |

(Continued)

FOREIGN PATENT DOCUMENTS

| CN | 202525937 U | 11/2012 |
|---|---|---|
| CN | 203506410 U | 4/2014 |

(Continued)

OTHER PUBLICATIONS

Paul Newman; International Search Report and Written Opinion; International Application No. PCT/AU2019/050085; dated Apr. 23, 2019; Australian Patent Office; Woden, ACT, Australia.

(Continued)

*Primary Examiner* — Paul R Durand
*Assistant Examiner* — Michael J. Melaragno
(74) *Attorney, Agent, or Firm* — Stevens & Showalter LLP

(57) ABSTRACT

An infuser container is disclosed comprising a container body for holding liquids and from which liquid is poured; and a removable infuser filter positioned across an interior of the container body so that liquid in a lower section beneath the infuser filter passes through the filter to dispense from the container body, wherein the filter is positioned across the container interior and retained in position against displacement thereof during pouring of liquids. Also disclosed is a container lid assembly.

13 Claims, 9 Drawing Sheets

(51) Int. Cl.
*A47J 31/06* (2006.01)
*A47J 31/44* (2006.01)
*B65D 47/26* (2006.01)
*B65D 47/32* (2006.01)

(52) U.S. Cl.
CPC ........ *A47J 31/4407* (2013.01); *B65D 47/268* (2013.01); *B65D 47/32* (2013.01)

(58) Field of Classification Search
CPC . A14J 31/4407; B65D 45/18; B65D 47/0876; B65D 51/1672; B65D 47/268; B65D 47/06; B65D 47/08; B65D 47/0857; B65D 47/0895; B65D 47/2006
USPC .................. 222/480, 486, 556, 563; 99/316
See application file for complete search history.

(56) References Cited

U.S. PATENT DOCUMENTS

| | | | | |
|---|---|---|---|---|
| 1,000,326 | A * | 8/1911 | Crofford | A47J 31/02 99/316 |
| 1,079,830 | A * | 11/1913 | Bohman | A47J 31/02 99/316 |
| 1,097,710 | A * | 5/1914 | Galt | A47J 31/02 99/299 |
| 1,097,711 | A * | 5/1914 | Galt | A47J 31/02 99/299 |
| 1,130,557 | A * | 3/1915 | Wick | A47J 31/02 99/316 |
| 1,165,376 | A * | 12/1915 | Adkins | A47J 31/02 99/316 |
| 1,563,155 | A * | 11/1925 | Buckingham | A47G 19/14 99/322 |
| 1,596,415 | A * | 8/1926 | Enright | A47J 31/14 126/388.1 |
| 2,072,324 | A * | 3/1937 | Wolcott | A47J 31/14 210/467 |
| 2,649,967 | A * | 8/1953 | Tyson | A47G 19/12 210/467 |
| 2,676,732 | A * | 4/1954 | Greenwood | A47G 23/0266 222/86 |
| 2,758,737 | A * | 8/1956 | Hennings | B65D 39/0023 215/231 |
| 3,422,998 | A * | 1/1969 | Murray | B65D 51/10 D9/450 |
| 4,723,693 | A * | 2/1988 | DeCoster | B65D 47/0876 222/545 |
| 5,388,729 | A * | 2/1995 | Gerringer | C02F 1/003 220/521 |
| 5,579,961 | A | 12/1996 | Zimmerman | |
| 5,601,217 | A * | 2/1997 | Wagner | B67D 3/0045 222/481.5 |
| 5,762,228 | A * | 6/1998 | Morgan | B65D 47/0895 16/257 |
| 5,897,036 | A * | 4/1999 | DeCoster | B65D 47/0876 222/545 |
| 6,231,226 | B1 * | 5/2001 | Neidigh | A47J 43/1081 366/256 |
| 6,263,781 | B1 | 7/2001 | Calagui | |
| 6,283,333 | B1 * | 9/2001 | Knickerbocker | B65D 47/2006 222/536 |
| 6,343,725 | B1 * | 2/2002 | Lohrman | B65D 47/2006 222/536 |
| 6,398,083 | B2 * | 6/2002 | Nybakke | A47G 19/12 222/481.5 |
| 6,832,700 | B2 * | 12/2004 | Roberts | B65D 47/2006 222/546 |
| 6,932,249 | B1 | 8/2005 | Pugne | |
| 7,975,883 | B2 * | 7/2011 | Laib | B65D 47/0895 222/484 |
| 8,541,039 | B2 * | 9/2013 | Lackey | C02F 1/003 99/275 |
| 9,988,177 | B1 * | 6/2018 | Ruprecht | B65D 47/065 |
| 10,420,432 | B1 * | 9/2019 | Krawczyk | A47G 19/12 |
| D866,923 | S * | 11/2019 | Clark | D2/773 |
| D883,727 | S * | 5/2020 | Samartgis | D7/319 |
| 2001/0030205 | A1 * | 10/2001 | Nybakke | A47G 19/12 222/475.1 |
| 2002/0166453 | A1 * | 11/2002 | Jensen | A47J 31/14 99/321 |
| 2004/0159684 | A1 * | 8/2004 | Roberts | B65D 47/2006 222/556 |
| 2005/0194410 | A1 * | 9/2005 | Pham | B65D 47/32 222/479 |
| 2007/0256569 | A1 | 11/2007 | Lee | |
| 2009/0120899 | A1 | 5/2009 | Stull, Sr. et al. | |
| 2009/0236373 | A1 * | 9/2009 | Laib | B65D 47/0895 222/484 |
| 2011/0088561 | A1 * | 4/2011 | Bodum | A47J 31/20 99/297 |
| 2011/0220606 | A1 * | 9/2011 | Alipour | B65D 81/2038 215/230 |
| 2011/0226133 | A1 * | 9/2011 | Shen | A47J 31/005 99/316 |
| 2012/0018459 | A1 * | 1/2012 | Richards | B65D 47/32 222/484 |
| 2012/0024161 | A1 * | 2/2012 | Chen | A47J 31/10 99/299 |
| 2012/0024162 | A1 * | 2/2012 | Chen | A47G 19/14 99/316 |
| 2012/0225175 | A1 * | 9/2012 | Lown | A23F 3/18 426/435 |
| 2014/0044837 | A1 | 2/2014 | Weisman et al. | |
| 2015/0157049 | A1 | 6/2015 | Fogelin et al. | |
| 2015/0208849 | A1 * | 7/2015 | Melzer | A47J 31/4403 99/287 |
| 2015/0259105 | A1 * | 9/2015 | Martinez | B67B 3/047 220/233 |
| 2016/0244217 | A1 * | 8/2016 | Maple | B65D 47/2018 |
| 2018/0170630 | A1 * | 6/2018 | Ayriss | A47G 19/2272 |
| 2019/0106255 | A1 * | 4/2019 | Cozzolino | B65D 47/32 |
| 2021/0008483 | A1 * | 1/2021 | Nishijima | B65D 47/06 |

FOREIGN PATENT DOCUMENTS

| | | | | |
|---|---|---|---|---|
| CN | 203724902 U | | 7/2014 | |
| CN | 105852560 A | | 8/2016 | |
| CN | 205615930 U | | 10/2016 | |
| JP | H07315416 A | * | 12/1995 | ............. B65D 51/18 |
| WO | WO-2016036880 A1 | * | 3/2016 | ............. A23F 5/262 |
| WO | WO-2019153038 A1 | * | 8/2019 | ............. A47G 19/12 |

OTHER PUBLICATIONS

First Search dated Jul. 5, 2021; Chinese Application No. 201980014971.2; The State Intellectual Property Office of People's Republic of China; Beijing, China.

The First Office Action dated Jul. 14, 2021; Chinese Application No. 201980014971.2; The State Intellectual Property Office of People's Republic of China; Beijing, China.

* cited by examiner

INFUSER CONTAINER

The present invention relates to a container suitable for holding liquid for drinking and incorporates a filter element. Examples of such containers include jugs or drinking vessels.

BACKGROUND

Containers and countless variations of containers are well known. A jug is a type of container usually associated with holding liquids and from which liquids can be poured. A trend amongst jug users is to infuse hot or cold liquids such as teas or water with infusing solids. Such solids often include fruits, vegetables, herbs, specially manufactured infusing tea bags, or the like. To stop infusing solids pouring out of the jug with the liquid, which can be frustrating, the solids can be captured in an enclosed infuser filter. The filter is often a cylindrical chamber mounted upright relative to the jug and hanging from an upper end of the container. Such infuser filters have an open end to receive the solids and capture them inside the filter.

A similar infusing concept can be used with drinking vessels, particularly re-usable vessels such as drink bottles. Namely, an infuser bottle includes a bottle body and a lid having a spout. In one example of an infuser bottle a central infuser pocket depends downwardly from the top of the bottle. The pocket has filter apertures and receives infusing solids such as cut fruit or tea leaves (depending on the fineness of the infusing filter holes).

Sometimes infusing solids when wet can form a tightly packed mass that block the flow of water or other liquid being poured from the container. Cleaning of the infuser pocket or chamber may also be difficult, particularly where the pocket is long and its interior can only be accessed from one end.

It is the above considerations and a desire to improve the effectiveness of infusing containers that have brought about the present invention for an infuser container.

SUMMARY OF INVENTION

In accordance with the present invention there is provided an infuser container comprising a container body for holding liquids and from which liquid is poured; and a removable infuser filter positioned across an interior of the container body so that liquid in a lower section beneath the infuser filter passes through the filter to dispense from the container body, wherein the filter is positioned across the container interior and retained in position against displacement thereof during pouring of liquids.

The infuser container in one embodiment is a jug where the container body is in the form of a jug body. In another embodiment the infuser container could be a drink bottle. In yet another embodiment the infuser container could be a storage container, such as one without a pouring spout, mainly designed to store infused liquids but which will allow liquids to be dispensed even without a spout.

The infuser container is suited for holding beverages and particularly beverage liquids containing infusing solids that infuse the drinking liquid. Such an example is water infused with fruit, herbs and/or vegetables. The infuser container may also be used to hold liquid not intended for consumption but rather could be suitable in a situation requiring a liquid to be strained from solids.

One advantage of the presently described infuser container is that when liquid is poured from the container the filter, which strains any solids beneath it, remains in position and does not dislodge under the force of liquid flowing out of the container or under the force of solids pushing against the filter during pouring. There is therefore confidence that the filter will remain in place and solids will not pour out of the container.

In a preferred embodiment, the infuser filter comprises an open structure (as opposed to a closed caged structure) with opposing faces, that are preferably parallel, whereby solids in the liquid are restrained by one face of the structure. This is different to some previously known filters for infusing liquids with fruit, etc., which capture the fruit in a caged compartment or pocket.

In one embodiment the infuser filter comprises a substantially planar structure comprising an array of small apertures sized to restrain most infusing solids yet allow the throughpassage of liquid. Preferably, the infuser filter has a flat filtering wall enclosed by an outer, flanged edge. The flat filtering wall is defined by an upwardly-facing face and a parallel downwardly-facing face, which is the filtering face.

The infuser filter can be positioned on a seat provided on an internal wall of the container body interior, so that the flanged edge is seated on an internal ledge on the container body. Depending on the angle at which the infuser filter sits inside the container body, the internal ledge need only extend part way around the internal wall of the container.

A retention function retains the infuser filter in position across the container interior in order to discourage displacement of the infuser filter during use of the container, and specifically during pouring of liquid from the container.

In one embodiment the retention function acts between the infuser filter and the container body. One possibility could be that the retention function is a snap fit connection between the outer edge of the infuser filter and the seat. Alternatively, the exterior dimensions of the infuser filter could be toleranced to a tight fit against the interior dimensions of the container body so that the infuser filter can be inserted into the container body then held in position by friction.

Still another possibility of a retention function could be the configurational relationship between filter and the container wall, wherein the length of the filter in one direction is larger than the corresponding length of the container interior so that the filter is seated on the seat at an angle with respect to a base of the container. In other words, the filter, having a longer length than the horizontal length of the container interior, is inserted into the container body by sliding it at an angle and seating it onto the seat, which is also provided at an angle to support the filter. Because the infuser filter is longer than the length of the container body, the lower end of the inclined filter cannot rotate out of position under the force of pouring liquid. The angular seated relationship between the infuser filter and container body retains the filter in position.

The infuser container preferably also comprises a lid. In addition to, or alternatively to, the above description of the retention function between the infuser filter and container body, the retention function could act between the infuser filter and the lid. In this embodiment the retention function could comprise the underside of the lid creating a surface against which a part of the infuser filter can bear against. Further still, a stop could be provided on the underside of the lid, which stop bears against the infuser filter. In the above example of the inclined or angled infuser filter, an uppermost part of the filter could bear against the underside of the lid.

In an embodiment the infuser filter comprises a handle. The handle facilitates removal of the infuser filter from the container interior. In a particular embodiment, the handle on the filter could comprise the retention function and bear against the underside of the lid.

As described above, infuser filter could be positioned diagonally across the container body so that one end of the filter is higher than an opposite end. Alternatively, the infuser filter could be positioned horizontally across the container body and retained by any of the above described retention functions that do no rely on the filter being angled relative to the container interior, or any other retention function that would hold a horizontal, or part-horizontal, infuser filter in position. The filter may further be positioned across the container by extending completely diagonally from an upper rear of the container body to a lower front of the container body where a container wall meets the container base.

The filter can therefore extend across the container body horizontally or at a diagonal angle with the filter front end dropping below the rear end at an angle anywhere between 0° and 90°, or between 0° and $\alpha°$, where $\alpha°$ is the angle between the plane in which the filter lies and the horizontal bottom of the container. $\alpha°$ will vary depending on the height of the container but could foreseeably be between 0° and 45°, or 0° and 60°, or 0° and 75°, or 0° and 85°.

In the embodiment where the infuser filter is diagonally positioned across the container interior, namely at an angle or inclination, a front end of the infuser filter that is substantially vertically aligned with, or is closer to, a pouring spout of the infuser container is lower than the opposite, rear end. The rear end, which is closer to a handle or gripping portion of the container body, is higher than the front end and is relatively close to a top of the container body. As discussed above, the proximity of the higher end of the infuser filter and the underside of the lid can form a retention function, which assists in holding the infuser filter in position.

In accordance with the present invention there is also provided a container lid assembly comprising:

a lid base having a peripheral skirt configured to fit onto a container opening of an associated container, the base having a cover portion that covers a substantial portion of the container opening, the lid base further including a pouring opening through the cover portion, and a spout opening through the base, wherein the pouring opening communicates fluid through to the spout opening;

and a lid actuator movably attached to the lid base and having a plug correspondingly sized to fit into the pouring opening such that in a closed position the plug blocks access of fluid from an interior of the container through to the spout opening but in an open position fluid can flow through the pouring opening and through the spout opening.

An advantage of the container lid assembly is that the dispensing mechanism, defined by a spout and the plug which acts as a valve, is solely carried by the lid. This means that the lid assembly can be used on any container with a corresponding opening, where the lid assembly provides an on-off pouring function. The container need only have an upper opening without any dispensing features.

In a preferred embodiment, a first flexible seal on the periphery of the plug resiliently flexes against an internal wall of the pouring opening to seal the pouring opening in the closed position. The plug with seal acts as a valve moving reciprocally through the pouring opening. Accordingly, in a closed position liquid in the container is prevented from entering the pouring opening, and/or prevented from reaching the spout opening through the pouring opening.

The spout opening can be configured to meet the pouring opening approximately perpendicularly through the skirt of the lid base.

In a further embodiment, there is a second flexible seal provided concentrically above the first flexible seal. This concentric double seal arrangement provides for enhanced sealing. Because of the pivoting action of the pivoting button, the reciprocal movement of the plug may not be precisely linear but rather slightly arcuate, and therefore will not be precisely aligned along a central axis of the pouring opening. The two concentric flexible seals on the plug will accommodate any gaps created by any misalignment by a slightly arcuate reciprocal movement to ensure a more effective seal.

The pivoting actuator may be in the form of a button, or a rocker. The pivoting point of the pivoting button is positioned toward the rear half of the button away from the plug end of the button. Pivot lugs on the button are mounted in lug recesses in an upper surface of the lid base. Furthermore, the button will preferably pivot to the open position only as far as to stop short of the top of the pouring aperture, which is preferably cylindrical and has depth. This encourages liquid to flow through into the spout opening and to not spill out from the top of the pouring opening.

BRIEF DESCRIPTION OF THE DRAWINGS

In order that the invention be more clearly understood and put into practical effect, reference will now be made to preferred embodiments of an assembly in accordance with the present invention. The ensuing description is given by way of non-limitative example only and is with reference to the accompanying drawings, wherein.

DETAILED DESCRIPTION OF PREFERRED EMBODIMENT

Figure 1:
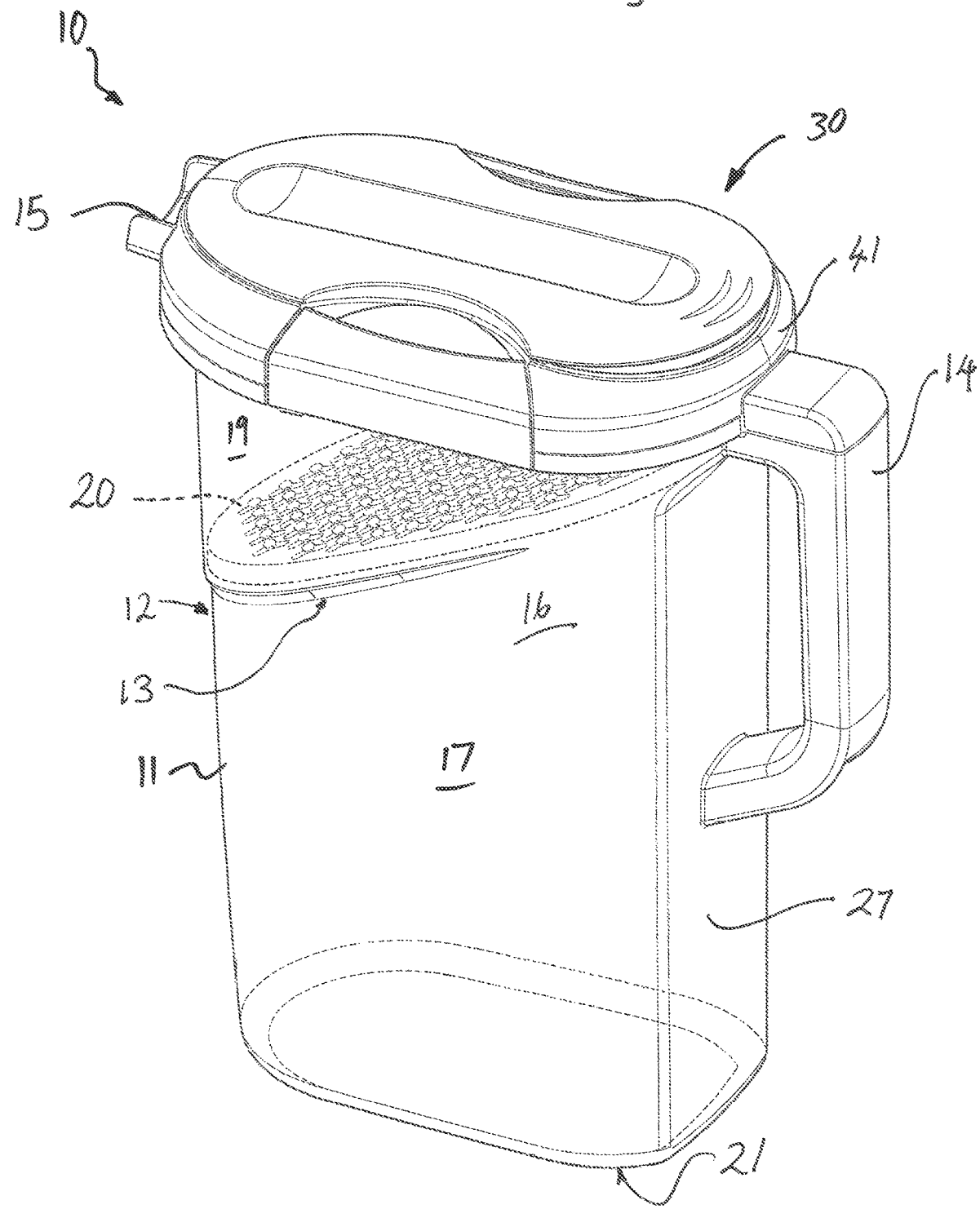
FIG. 1 is a rear isometric view of an infuser container in accordance with an embodiment of the invention.

An embodiment of an infuser container is illustrated in the drawings. Specifically illustrated is an infuser jug 10, although it is understood that the infuser container may also be in the form of another kind of liquid receptacle that may require filtering, such as a drinking bottle or a watering can (for non-potable liquids). For the purpose of clearly describing the present invention, the following description will specifically make reference to an infuser jug 10 for infusing and pouring beverages.

Infuser jug 10 comprises a jug body 11 for holding liquids and from which liquid is poured, and a container/jug lid 30. The lid 30 has a spout 15. Jug body 11 has a bottom wall 21 and a wall 27 extending upwardly from the bottom wall 21. It also has a handle 14 which users can grip to pour liquid from the jug 10. As shown in dashed lines in FIG. 1 as well as the sectional views of FIGS. 8 and 9, an infuser filter 20 is removably positioned across and interior 16 of jug body 11 so that liquid in a lower section beneath the infuser filter passes through the filter to dispense from the jug 10. In use, filter 20 is lifted out of the jug body 11 which is filled with water (or other potable liquid or beverage). Infusing solids, such as cut citrus, mint, or any other wide range of foods and flavours, are placed in the jug body containing liquid. The infuser filter 20 is then placed back inside the jug interior 16 and seated in position.

Infusing solids are kept in a lower section 17 of the jug body beneath the filter and prevented by the filter 20 from escaping through a spout 15 of the jug. Furthermore, the infuser filter is retained in position across the container in a manner where it is retained against displacement during pouring, which may otherwise occur under the force of pouring fluid, or under the force of solids pushing against the filter and/or under the force of gravity.

Infusing solids such as fruit, vegetables, herbs, or the like can be free flowing in the lower section 17 of the jug body 11 because the lower section 17 is relatively a large volume compared to the total volume of the jug interior 16 giving the solids space to flow around and not be captured in a caged pocket as with known container infusers. Advantageously, because the infusing solids are located in the lower section 17, liquid at even low levels will continue to be infused with flavour from the infusing solids and then strained through the infuser filter 20 as liquid is poured from the jug 10.

Figure 6:
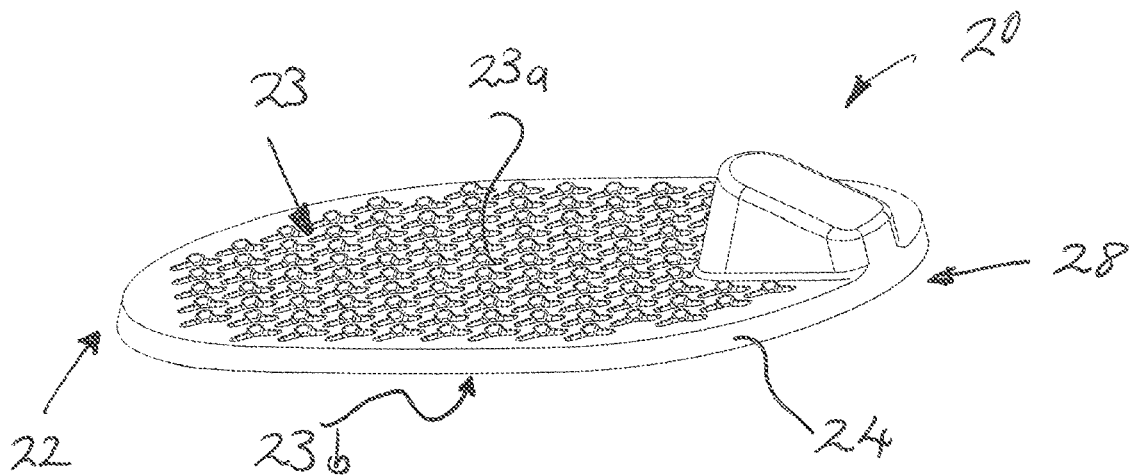
FIG. 6 is a first view of an infuser filter of the infuser container.
Figure 7:
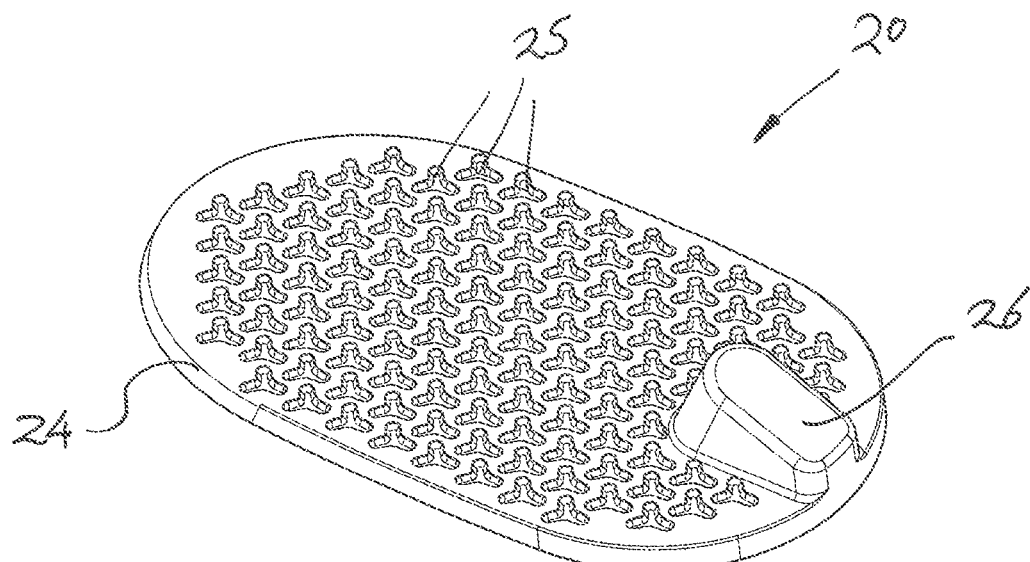
FIG. 7 is a second view of the infuser filter.

Infuser filter 20 is removable from the jug interior 16 so that solids can be placed into the lower section 17 as described above, and to also make it easier to clean the filter and container body. Filter 20 as shown in FIGS. 6 and 7 is a substantially planar structure with an array of small filtering apertures 25 lying across a flat filtering wall 23. The apertures 25 restrain most infusing solids yet allow the passage of liquid. The apertures may be circular or otherwise form a polygonal opening that will allow liquid through yet filter solids of a minimum size. In the embodiment shown the filtering apertures 25 are "Y"-shaped openings. Filtering wall 23 has opposing faces 23a, 23b on either side of the wall 23 where an upper face 23a faces a filtered side of the wall and downward face 23b restrains the infusing solids.

Figure 2:
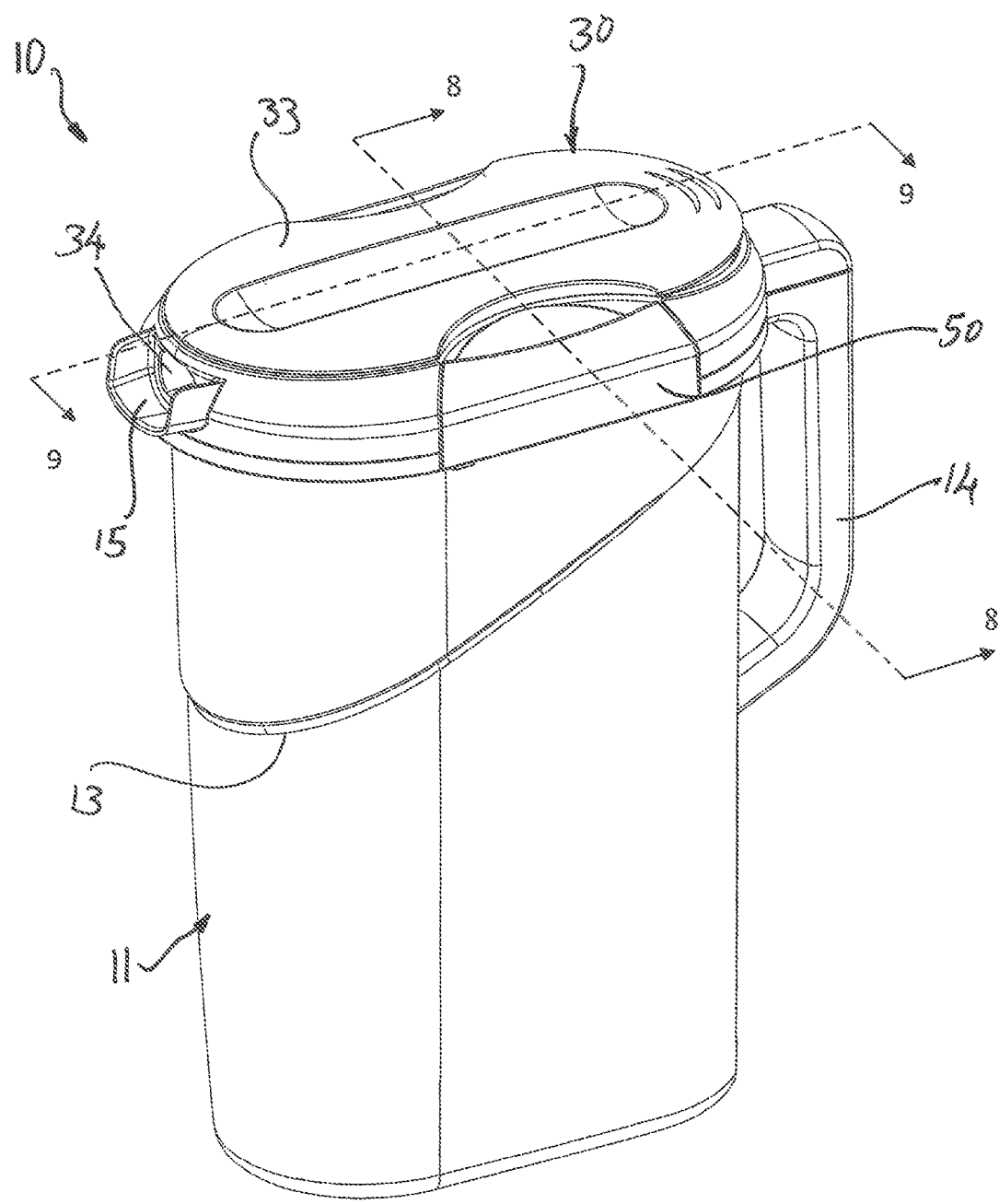
FIG. 2 is a front isometric view of the infuser container.
Figure 3:
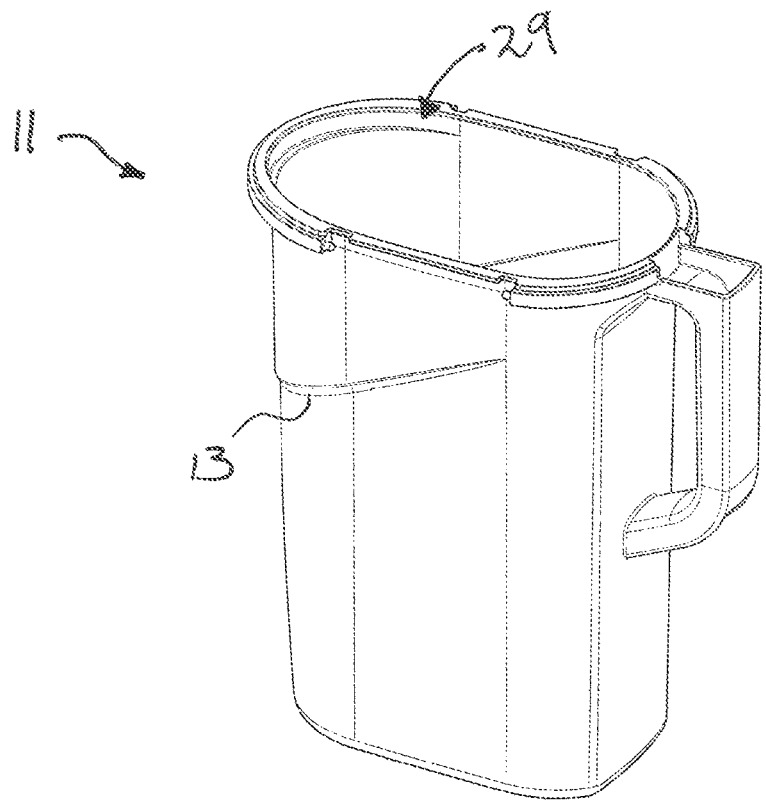
FIG. 3 is a top isometric view of the container's body.
Figure 4:
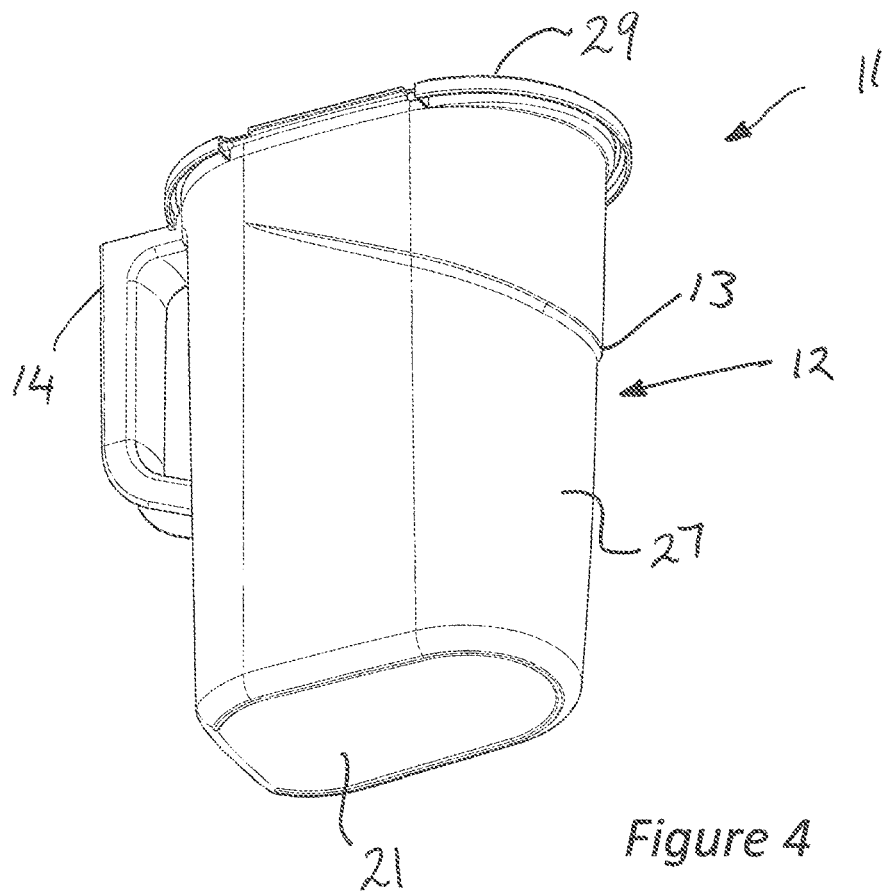
FIG. 4 is a bottom isometric view of the container's body.
Figure 5:
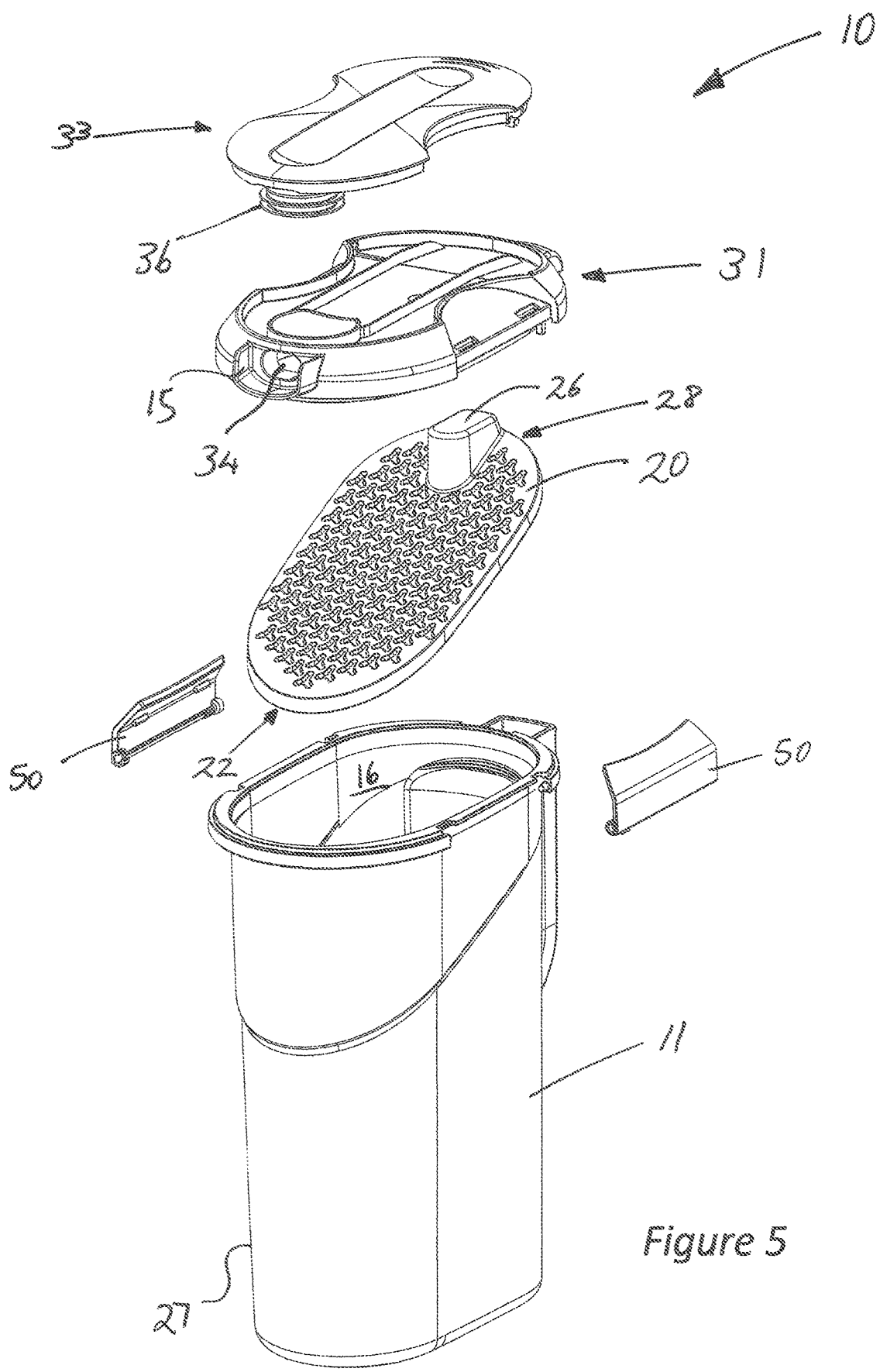
FIG. 5 is an exploded view of the infuser container.

A flanged outer edge 24 as illustrated in FIGS. 5 to 7 extends around the periphery of the infuser filter and contacts the interior wall 18 of the jug body thereby dividing the interior of the jug body into the lower section 17, which contains the infusing solids, and an upper section 19, which is kept free of infusing solids by the infuser filter 20. The outer edge 24 of the filter is seated on an internal seat on the wall of the jug body. As specifically shown in the drawings including FIGS. 2 to 4 and sectional views of FIGS. 8 and 9, the seat is a ledge 13 formed on the internal wall 18 of the jug body. The formation of ledge 13 on the inside of the jug body 11 can be seen from the exterior in FIGS. 2, 3 and 4. The ledge 13 may be formed so as to seat the filter horizontally across the jug interior 16 or diagonally across at an angle, as illustrated in the figures where a front end 22 of the filter is positioned horizontally lower than the opposite rear end 28, which is higher. The ledge 13 need not be a continuous ledge but may extend only part way around the interior wall 18 of the jug body or extend as a series of discontinuous protrusions on the internal wall that can support the filter 20.

In the embodiment shown the ledge 13 is more prominent (namely, protrudes internally further) at a spout side 12 of the jug body 11 and then tapers off into the interior wall 18 as the ledge moves upward and rearward of the jug body away from the spout. In effect, because the jug body is elliptical in shape in plan view, the ledge takes on a "U" shape with the nadir of the "U" at the front-most side (i.e. spout side 12) of the jug body.

Broadly speaking, the filter 20 is retained against displacement during pouring by a retention function. The retention function discourages filter displacement and may be in a number of different functional forms.

For instance, in one form the retention function acts between the infuser filter and the container body. One such example is the retention being a snap fit connection between the outer edge 24 of the filter and the ledge 13. Or another way could be to manufacture the filter so that the outer edge is the same dimensions, or slightly larger than, the internal dimensions of the jug body so that the filter can be slid into position and forced against the internal walls of the jug body. For this arrangement to succeed one or both of the filter or jug body would need to be resilient in order to achieve a close dimensional tolerance between the filter and jug interior whereby the filter is held in position by friction.

In another form the retention function could act between the infuser filter 20 and the lid 30. One example of such a function would be where the lid, or a part thereon, acts to stop the filter against displacement. By assembling the lid on the jug body the proximity of the lid to the infuser could function to hold the infuser in place. A more specific example is described below in relation to the preferred embodiment.

Further still, the retention function could be a combination of the above described functions.

In the present embodiment described and illustrated the retention function is primarily defined by the configurational relationship between the filter and the container wall. Specifically, how the infuser filter sits within the body interior prevents or discourages displacement of the filter. This is achieved by the filter 20 having a longer planar length than the corresponding length of the jug body 11 so that the infuser must sit within the jug interior 16 at an angle where the front end 22 of the filter 20 (on the spout side 12 of the jug body 11) is positioned lower than the rear end 28, which is closest to the jug handle 14.

The angle of inclination of the filter inside the jug body 11 can vary but is expected to be operable in the range of 0° and 45°, or 0° and 60°, or 0° and 75°, or 0° and 85°, or 0° and 90°. If there is an inclination of the filter an aesthetically preferred range would be a 20° to 60° inclination relative to a horizontal reference plane, which is parallel to a surface on which the jug 10 sits.

Figure 8:
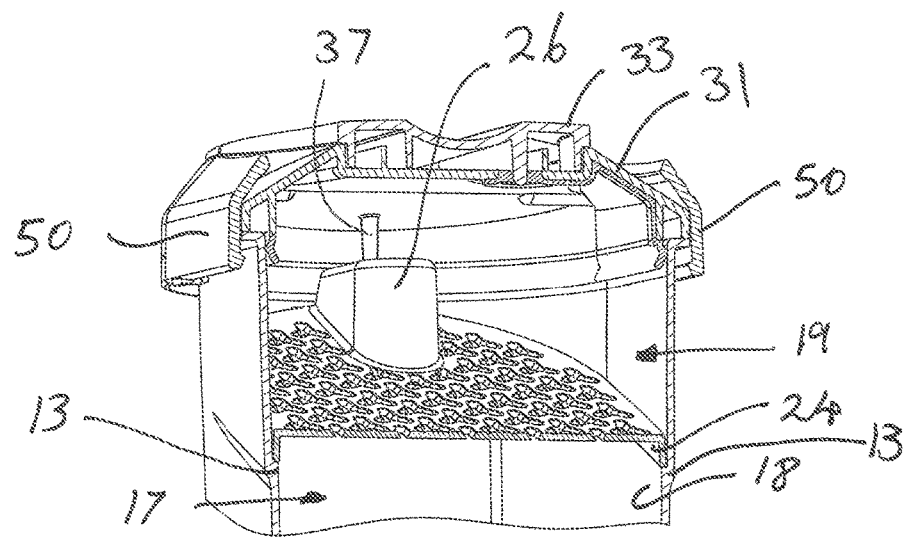
FIG. 8 is a sectional width view of an upper part of the infuser container taken along section line 8-8 of FIG. 2.
Figure 9:
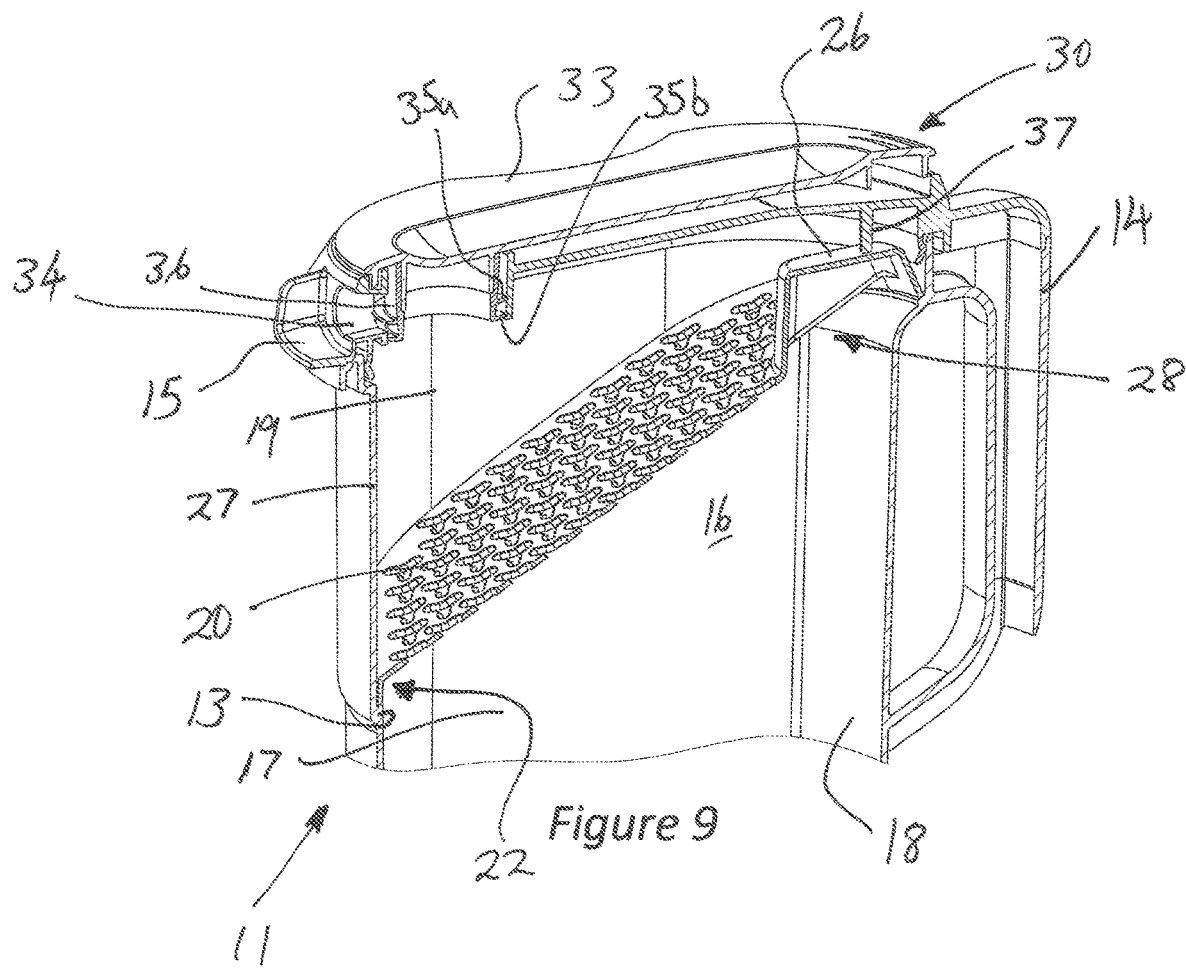
FIG. 9 is a sectional length view of an upper part of the infuser container taken along section line 9-9 of FIG. 2.

This seated relationship of the filter with respect to the jug body, in use, prevents the filter displacing. With reference to FIGS. 5, 8 and 9, it can be seen that the filter is mounted in the jug body 11 at an angle with the front end 22 relatively lower in the upstanding jug 10 than the opposite rear end 28. During pouring, the force of the liquid and any solids contained in the lower section 17 underneath the filter 20 will bear against the underside face 23b of the filter close to and at the front end 22. In response, the front end 22 of the filter will want to rotate in a clockwise direction as illustrated in FIG. 9. However, rotation will not be possible because the internal wall 18 of the jug blocks the arcuate path the filter would take if there was no wall present and it was free to rotate. In other words, the filter is wedged in position under a pouring force and the greater the force of the pouring water and solids against the underside of the filter, the greater the wedge that will discourage displacement. Accordingly, the mounted configuration and the angular relationship between the filter 20 and interior wall of the jug body 11 acts to stop the filter from pivoting out of position.

A further retention function is described herein and shown in the drawings, although it is understood that only one retention function is required to discourage filter displacement in the jug 10. As shown in FIGS. 8 and 9, the rear end 28 of the filter is situated high up in the jug body 11 and close to an underside of the lid 30. The underside of the lid 30 creates a stopping surface against which the rear end 28 can bear against thereby preventing the rear end, and in this case the entire filter 20, from sliding upward and displacing.

Specifically, the highest point of the rear end 28 bears against a corresponding stop on the underside of the lid 30. In FIGS. 8 and 9 it can be seen that a downwardly depending pin 37 acts as a stop against the uppermost part of the infuser filter 20, which is shown as a filter handle 26. In use, filter handle 26 is used to remove and replace filter 20 inside the jug body 11 and to bear against the pin stop 37. By preventing the filter sliding upward in the jug body 11 rotation of the front end 22 of the filter is also prevented.

With the above described retention functions of both the angular positioning of the filter 20 in the jug interior 16, and the stop at the higher end of the filter, displacement of the infuser filter is discouraged and even prevented while pouring liquid from the jug 10 that has been infused with infusing solids restrained in the lower part of the jug body.

Choosing suitable materials for the infuser container can vary and will depend on the container application and price point at retail sale. The jug body could be made from plastics, where a clear plastics such as Tritan® would provide the added aesthetic appeal of revealing the infusing solids. Alternatively, the jug body could be made of glass, metal or ceramic, to name a few examples. The infuser filter could also be made of all of these materials, although scratching of the jug body through sliding the filter in and out of it should be avoided via the selection of respective materials. A plastics infuser filter will offer some give and resilience and sit properly on the ledge 13.

Figure 14:
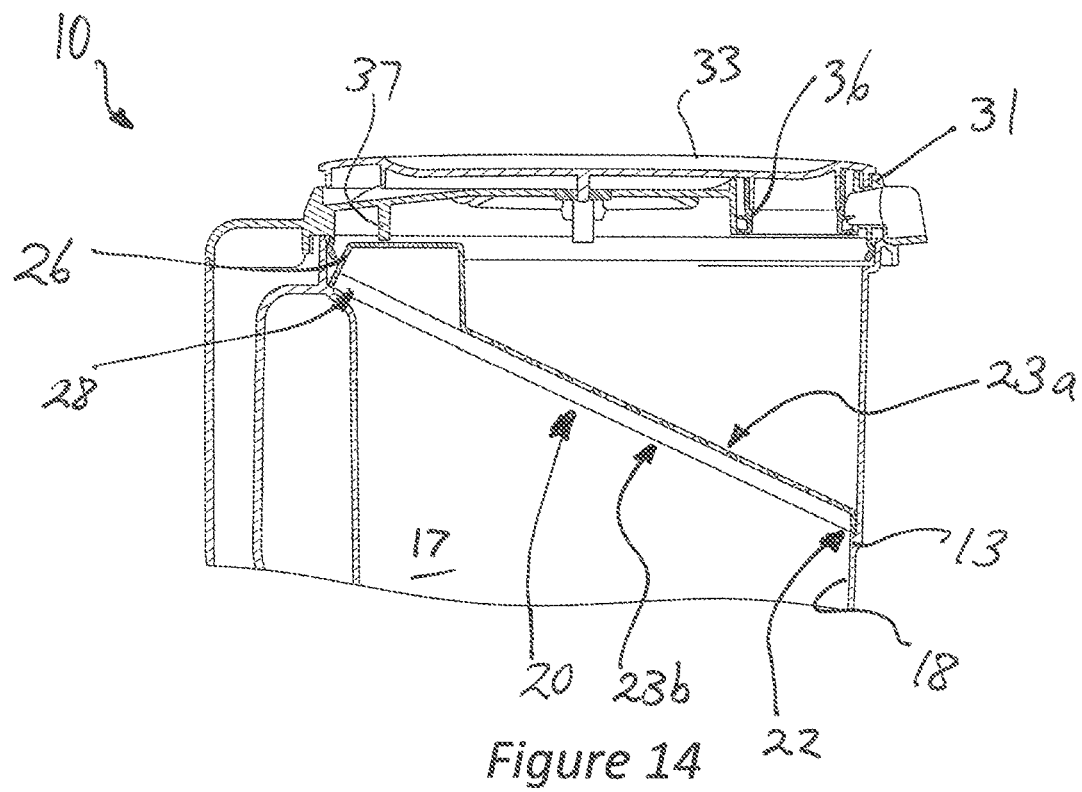
FIG. 14 is a cross-sectional view of an upper part of an infuser container in accordance with an embodiment showing the container lid in a closed position.
Figure 15:
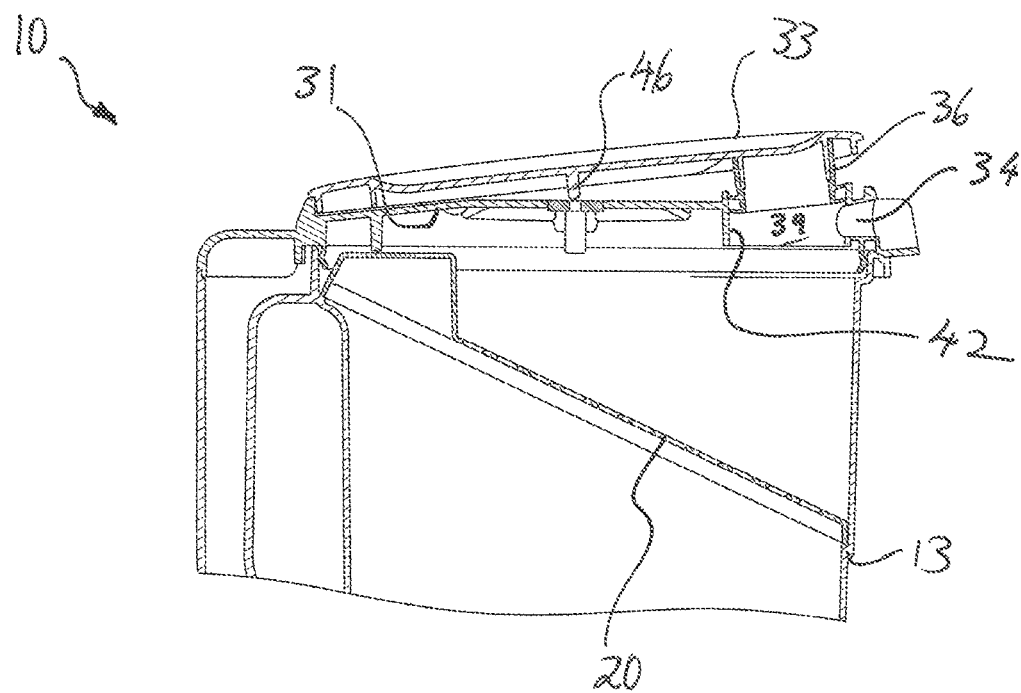
FIG. 15 is a cross-sectional view of an upper part of the infuser container in an open position.

The drawings also show a lid 30 (also referred to as a lid assembly) comprising a lid base 31 (see FIGS. 10 and 11) and a lid actuator in the form of a pivoting rocker 33, or button, (see FIGS. 12 and 13) that is moveable to open and close communication of liquid through the spout 15 in the lid 30. FIG. 14 illustrates the pivoting rocker 33, and therefore lid 30 in general, in a closed position while FIG. 15 illustrates the rocker 34, and lid 30, in an open position.

The lid assembly described herein is useful in that it carries the entire dispensing mechanism of the container with lid, including the pouring spout 15 (often carried by an upper rim of a container body), and the actuating valve device responsible for opening and closing the spout opening. In this way the lid assembly can be fastened to any correspondingly sized opening on a container and used as an effective pourer, regardless of whether the container was designed to function as a pourable container.

The lid base 31 is removably attached to an upper opening 29 of a container, such as jug body 11. The lid base 31 has a peripheral skirt 41 for attaching to the upper opening of a container, and the skirt in this instance is double walled with an outer skirt 41*a* for sitting on an outside of an upper edge of the container opening, and an inner skirt 41*b* carrying a lid seal 32 that sealingly sits on an inside of the upper edge to facilitate effective sealing of the lid assembly 30 onto the container opening 29.

It is however understood that the lid 30 may instead be attached to a receptacle for holding liquid other than a jug, such as a drink bottle.

Figure 10:
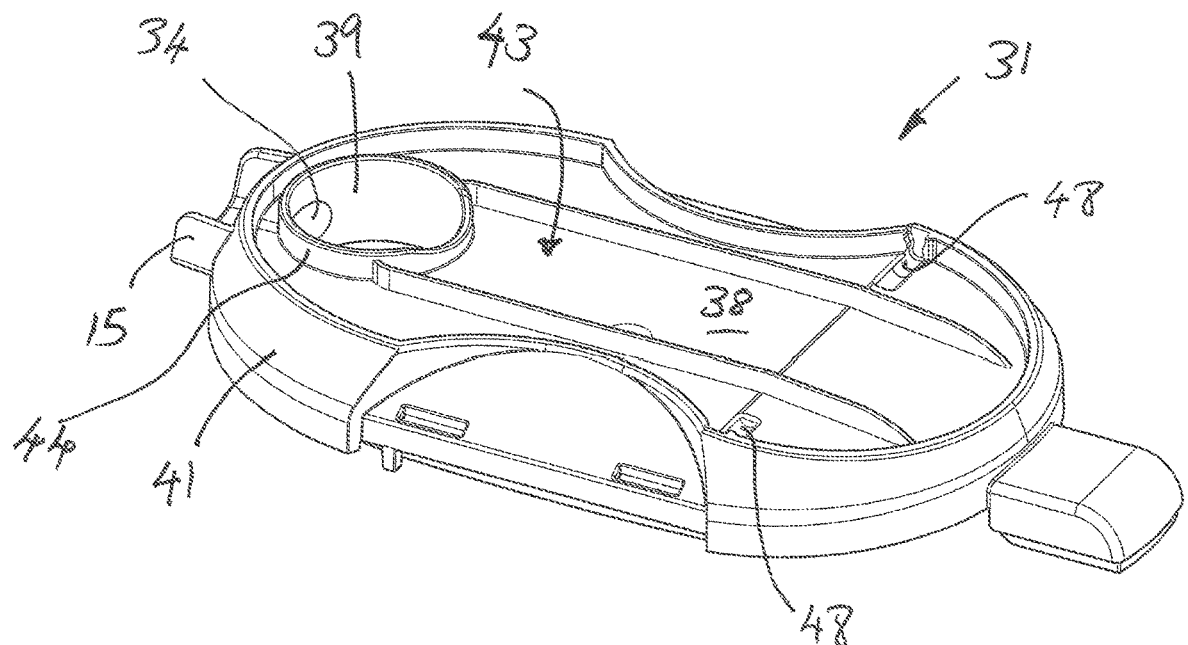
FIG. 10 is an upper isometric view of a lid base of a container lid in accordance with another embodiment of the invention.
Figure 11:
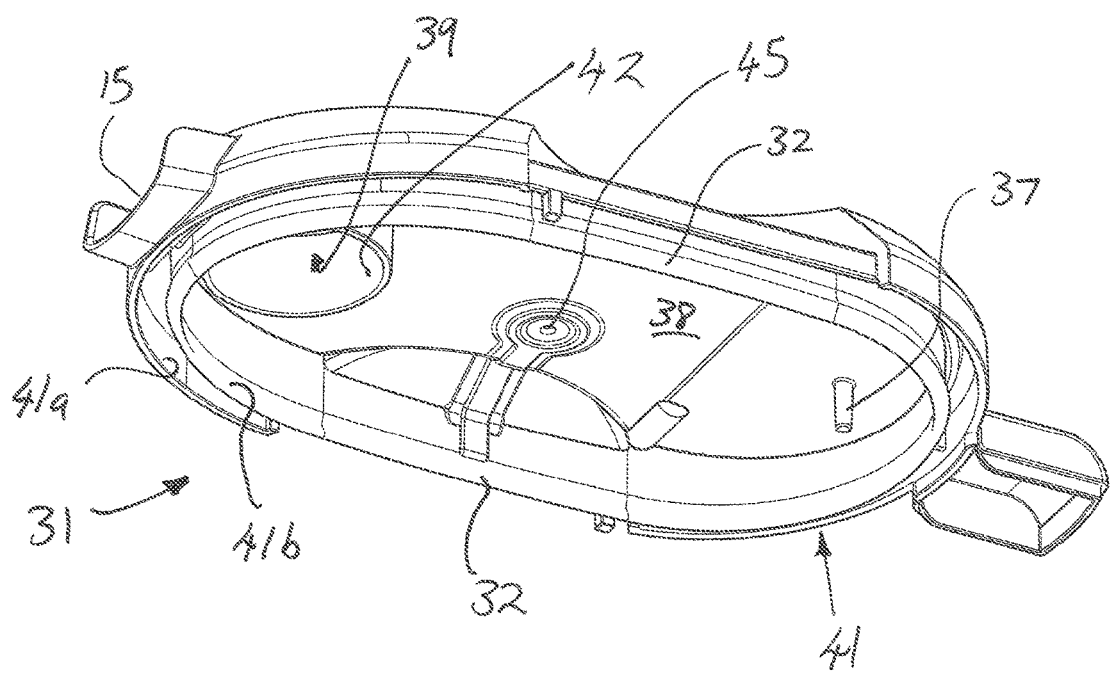
FIG. 11 is an underneath isometric view of the lid base.

The lid base 31 has a cover portion 38 that covers a substantial portion of the container's opening in order to keep liquid inside the container even if the container is moved/jolted, as well as when the liquid is poured from the container. To allow for dispensing of liquid the cover portion has a pouring opening 39 at one end of the lid base 31. The pouring opening 39 in the described embodiment, as shown in FIGS. 10 and 11, is a short cylindrical tube-like opening with a cylindrical wall 42 extending through the lid base in a generally perpendicular direction to the horizontal when the jug 10 is stood upright on a surface. The pouring opening opens to a top side 43 of lid base 31, including a short upwardly protruding lip 44 surrounding the pouring opening.

A vent hole 45 also extends through the cover portion 38 and is designed to be opened in the lid's open position and plugged closed with a spigot 46 on the underside of the rocker 33 when in the closed position. The vent and the lid seal 32 are overmoulded in a resilient material, such as a TPE material (thermoplastic elastomer), to encourage better sealing onto the container opening 29 and better plugging of the vent hole 45.

As discussed earlier, the underside of the lid base 31 also carries the downwardly extending pin stop 37 that contacts the infuser filter 20 and helps retain it in position.

The lid base 31 also carries the spout 15—a cupped lip projecting from one end of the lid base—which dispenses liquid exiting from a spout opening 34. Spout opening 34 extends through a wall of the base to meet the pouring opening. Specifically, spout opening 34 extends through the inner and outer peripheral skirts 41*a*, 41*b* and through the pouring opening wall 42 to form a liquid communication passage between the pouring opening and the spout 15. Spout opening is, in the illustrated embodiment, directed normally to the vertical direction of the pouring opening (when jug 10 is viewed in an upright position), and namely, horizontally. Accordingly, to dispense liquid from the container, the container is tipped (by gripping handle 14) to make the liquid flow through the pouring opening 39 and then through the spout opening 34. Liquid is prevented from flowing out of the open top of the pouring opening 39 because pivoting rocker 33 blocks the top of pouring opening against fluid flow.

Figure 12:
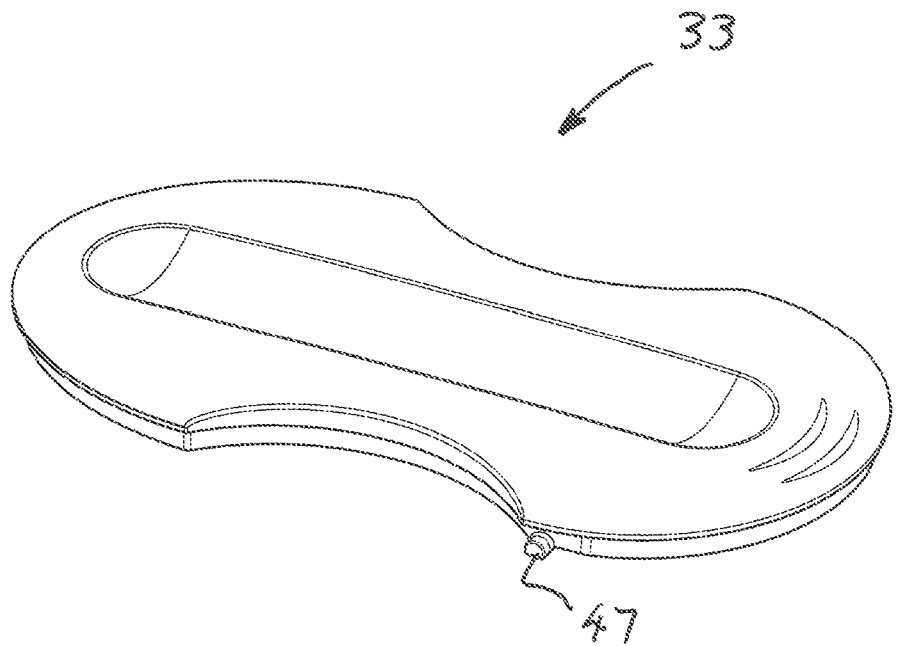
FIG. 12 is an upper isometric view of a pivoting actuator of the container lid.
Figure 13:
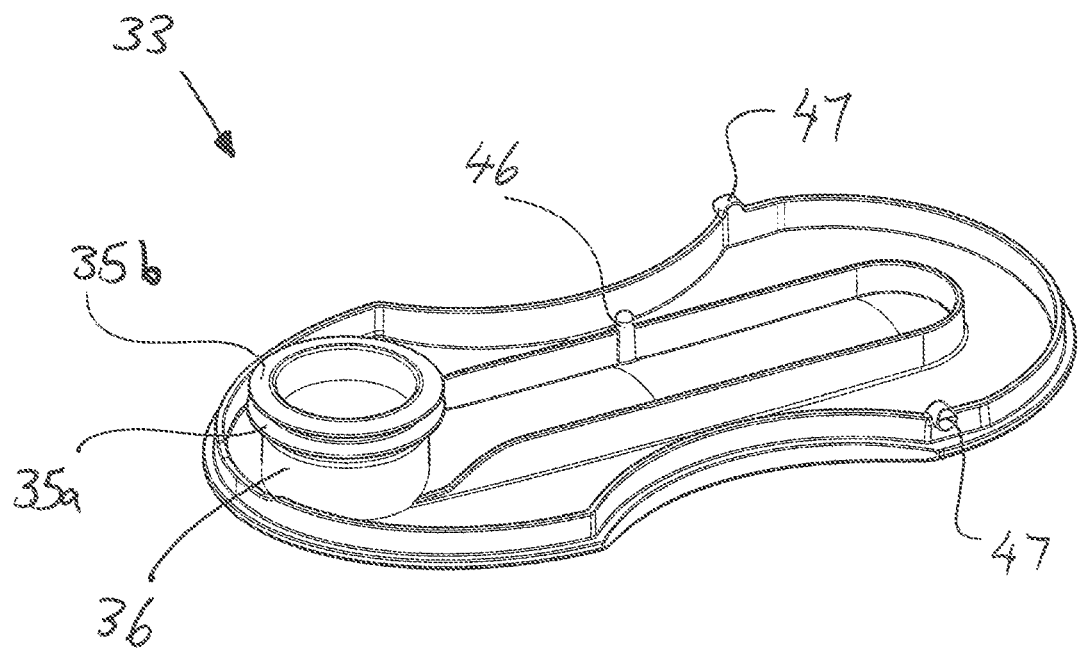
FIG. 13 is an underneath isometric view of the pivoting actuator.

Pivoting rocker 33 is illustrated in FIGS. 12 and 13. Rocker 33 has a plug 36 toward one end of the rocker 33, which plug is received in pouring opening 39 substantially at all times, yet translates more or less into the pouring opening depending on whether the lid assembly is to be closed or open. Plug 36 is corresponding in size and shape to pouring opening 39 such that in the present embodiment plug 36 is cylindrical in shape.

Towards an opposite end to the plug, short pivoting lugs 47 extend outwardly of the rocker 33 to be received in correspondingly sized lug recesses 48 on the top side 43 of the lid base 31. The pivoting point for rocker 33 is at the engagement of the pivoting lugs 47 in lug recesses 48. From that point the rocker 33 can be pressed at one end (opposite to the plug 36) to open the lid assembly 30, and pressed at the plug end to close the lid assembly. This movement need not be large and may fall in the range of 5° to 30°, but should be sufficient to effect a translation of the plug 36 inside pouring opening 39 between a position in which plug 36 covers and uncovers spout opening 34, respectively closing and opening the lid assembly 30.

As illustrated in FIG. 14 showing the lid assembly 30 in a closed position, plug 36 effectively acts as a valve moving reciprocally inside pouring opening 39. In FIG. 14, plug 36 covers spout opening 34 from inside pouring opening 39 thereby blocking any flow of liquid through the spout opening. Pressing rocker 33 into an open position moves plug upwardly and outwardly of pouring opening 39 (though not all the way out) to uncover spout opening 34 and allow liquid entering pouring opening 39 to flow through to spout opening 34 and then out through spout 15. This position is illustrated in FIG. 15 which shows the lower end of plug 36 sitting almost at the top of the upper end of pouring opening 39, blocking the upper open end of pouring opening but uncovering the spout opening to allow liquid to flow out of spout opening 34.

The plug carries a flexible seal 35a, 35b around its circumference (or otherwise its periphery depending on the shape of the plug) to provide for a more effective seal against liquid leakage through the pouring opening but also through the spout opening. The flexible seal may also be made of TPE but could be made from silicon or other sealing material. In the present example the flexible seal is in fact a double seal comprising a first flexible seal 35a on the plug's periphery and a second, concentric flexible seal 35b spaced lower from the first seal 35a. This concentric double seal arrangement ensures a more reliable sealing performance because the pivoting action of the rocker 33 is not precisely linear. With the pivoting point of the rocker 33 spaced away toward an opposite end of the rocker 33 to the plug, the plug 36 will follow a slightly arcuate path in its reciprocating motion relative to a central axis of the pouring opening 39, which can lead to misalignment and gaps between the plug and cylindrical wall 42 of the pouring opening. Such gaps can be accommodated by choosing tight sliding tolerances with the plug and through the flexibility of the plug seal. However, the concentric double seal will offer improved sealing.

Nominating the spout side of the lid 30 as the front, and the container handle side as the back, the upper and lower plug seals 35a, 35b will perform a back-up seal for the other of the plug seal in one of the open or closed positions. To demonstrate this more clearly, reference is made to FIG. 14 where the plug 36 is fully inserted in the pouring opening 39 in the closed position. Lower flexible seal 35b locates just below spout opening 34 providing the main barrier against liquid flowing through to the spout opening 34. Because of the slightly misaligned relationship between the arcuate movement of the plug inside the linear cylindrical pouring opening 39, the lower flexible seal 35b may form a tighter seal with the pouring opening wall 42 at the front of the seal 35b than at the back where the seal is less tight. However, if water manages to infiltrate the less tight back seal the upper plug seal 35a will block any further infiltration of liquid.

The plug seals 35a, 35b include an outward flexible flange which means the flanges can flex one way or the other (upper or down as illustrated in the direction shown in the drawings) to follow the contour of the pouring opening wall 42 and bear against the wall 42 thereby providing a more reliable and effective seal formed over a larger surface area than if the seal was a solid component with no flexibility.

In the open position of FIG. 15 the double seals 35a, 35b both act to stop liquid from escaping the top of the pouring opening, with the upper plug seal 35a providing the final barrier against liquid escaping.

Also illustrated in the drawings are side clips 50, which are mounted on opposing upper edges of the jug body 11 and rotate to close onto the top side 43 of the lid base 31 for clipping the lid securely to the base. The clips may provide an additional tightening of the lid-container engagement.

The present invention has a number of benefits. To reiterate, liquid stored in the container can be effectively infused with flavours and colours from infusing solids, yet be poured from the container without the solids following through with the pour. The orientation of the filter in the container body means that the solids can be free flowing in a large area without being caged and will continue to infuse the liquid until very low liquid levels.

The lid assembly provides an effective sealed valve mechanism for opening and closing the jug's dispensing ability. The relationship between the spout opening, pouring opening and valve in the form of a pivoting plug is easy to use and ensures liquid is dispensed only when desired and neatly without spillage. Furthermore, the lid assembly is sealingly attached placed on a container, and can be pulled tightly against the container opening using the side clips, so that liquid will not escape out of the rim of the upper container opening, nor inadvertently out of any other part of the lid assembly other than the spout, when a user desires it.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, namely, to specify the presence of the stated features but not to preclude the presence or addition of further features in various embodiments of the invention.

The invention claimed is:

1. A container lid assembly comprising:
a lid base having a peripheral skirt configured to fit onto a container opening of an associated container, the base having a cover portion that covers a substantial portion of the container opening, the lid base further including a pouring opening through the cover portion that is defined by a cylindrical wall extending through the lid base, and a spout opening through the cylindrical wall and through the skirt, wherein the pouring opening communicates fluid through to the spout opening;
and a lid actuator pivotally mounted on the lid base and having a plug correspondingly sized to fit into the pouring opening and including a flexible seal comprising a first flexible seal and a second flexible seal provided on the periphery of the plug where the second flexible seal is provided concentrically above the first flexible seal relative to a lower free end of the plug, the first and second flexible seals resiliently flex against an internal wall of the pouring opening such that in a closed position the first flexible seal locates below the spout opening so that the plug and the first and second flexible seals block access of fluid from an interior of the container through the pouring opening and through the spout opening; and as the lid actuator is pivoted to an open position the plug and the first and second flexible seals follow an arcuate path relative to a central axis of the pouring opening so that, in the open position, the first and second flexible seals bear against the cylindrical wall above the spout opening so as to, together with the plug, block an upper end of the pouring opening but allow fluid to flow through to the spout opening.

2. The container lid assembly claimed in claim 1, wherein the first flexible seal and/or the second flexible seal is an outward flexible flange that can flex to follow the contour of the cylindrical wall as the lid actuator is moved.

3. The container lid assembly claimed in claim 1, wherein the lid actuator is configured to only pivot to the open position as far as to stop short of a top of the pouring opening thereby sealing the top of the pouring opening against spilling fluid.

4. An infuser container comprising a container body for holding liquids and from which liquid is poured and a container lid assembly as claimed in claim 1; further comprising a removable infuser filter positioned across an interior of the container body so that liquid in a lower section beneath the infuser filter passes through the filter to dispense from the container body, wherein the filter is positioned across the container interior and retained in position against displacement thereof during pouring of liquids.

5. The infuser container claimed in claim 4, wherein the infuser filter comprises an open structure with opposing faces whereby solids in the liquid are restrained by a lower face of the structure.

6. The infuser container claimed in claim 4, wherein the infuser filter comprises a substantially planar structure.

7. The infuser container claimed in claim 4, wherein the infuser filter is positioned on a seat provided on an internal wall of the container body interior.

8. The infuser container claimed in claim 4, wherein the infuser filter is retained in position by a retention function.

9. The infuser container claimed in claim 8, wherein the retention function acts between the infuser filter and the container body.

10. The infuser container claimed in claim 8, wherein the retention function acts between the infuser filter and the lid assembly.

11. The infuser container claimed in claim 10, wherein the retention function comprises a stop on the underside of the lid assembly that bears against the infuser filter.

12. The infuser container claimed in claim 4, wherein the infuser filter is positioned diagonally across the container body so that one end of the filter is higher than an opposite end.

13. The infuser container claimed in claim 12, wherein the end of the infuser filter that is closest to an upper end of the container body is higher than the opposite end, which opposite lower end is aligned at a spout-side of the infuser container.

* * * * *